March 8, 1955
J. L. WHITMORE
2,703,518
SUBSOIL TOOL
Filed Oct. 27, 1953
3 Sheets-Sheet 1
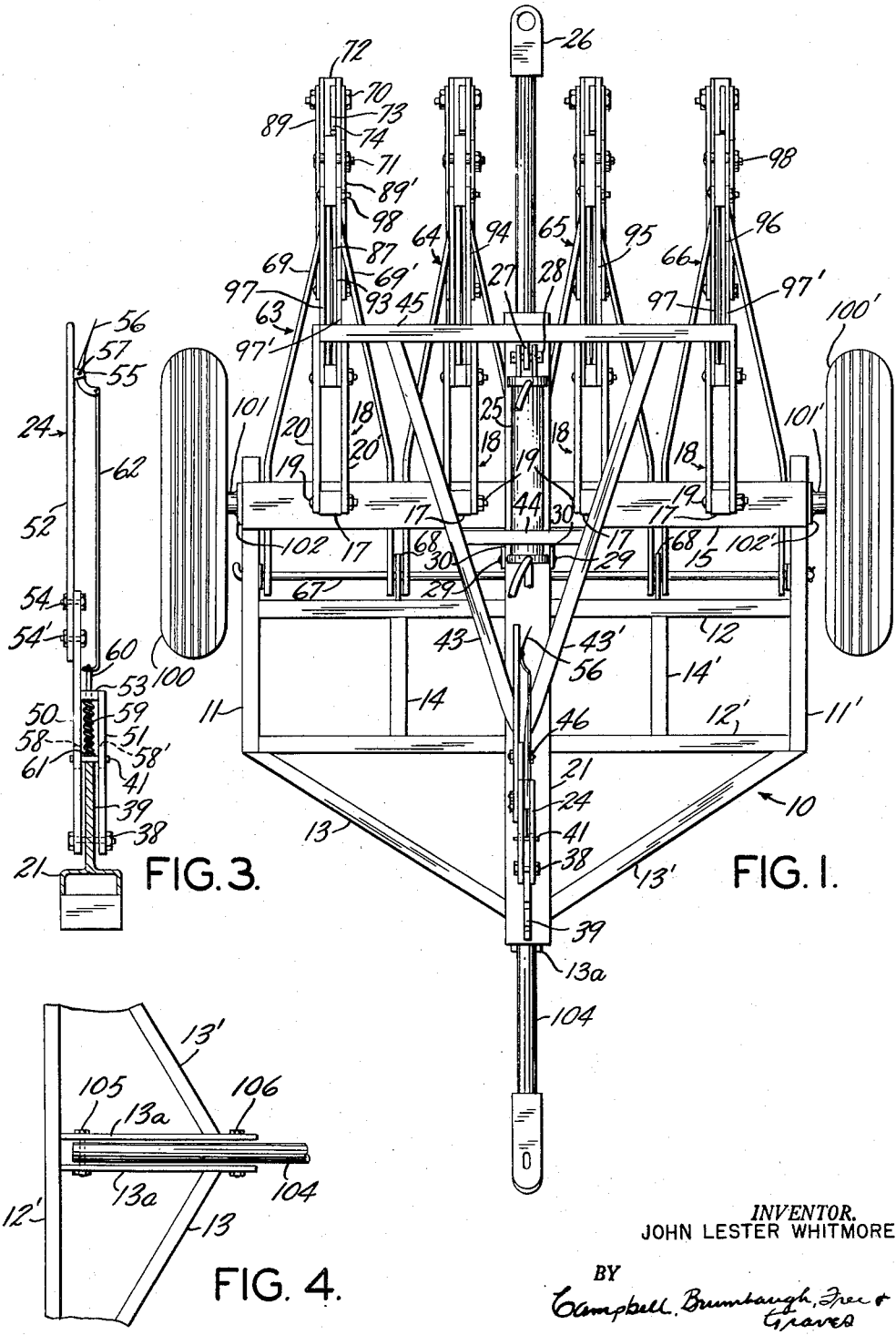
INVENTOR.
JOHN LESTER WHITMORE
BY
Campbell, Brumbaugh, Free &
Graves
his ATTORNEYS March 8, 1955
J. L. WHITMORE
2,703,518
SUBSOIL TOOL
Filed Oct. 27, 1953
3 Sheets-Sheet 2
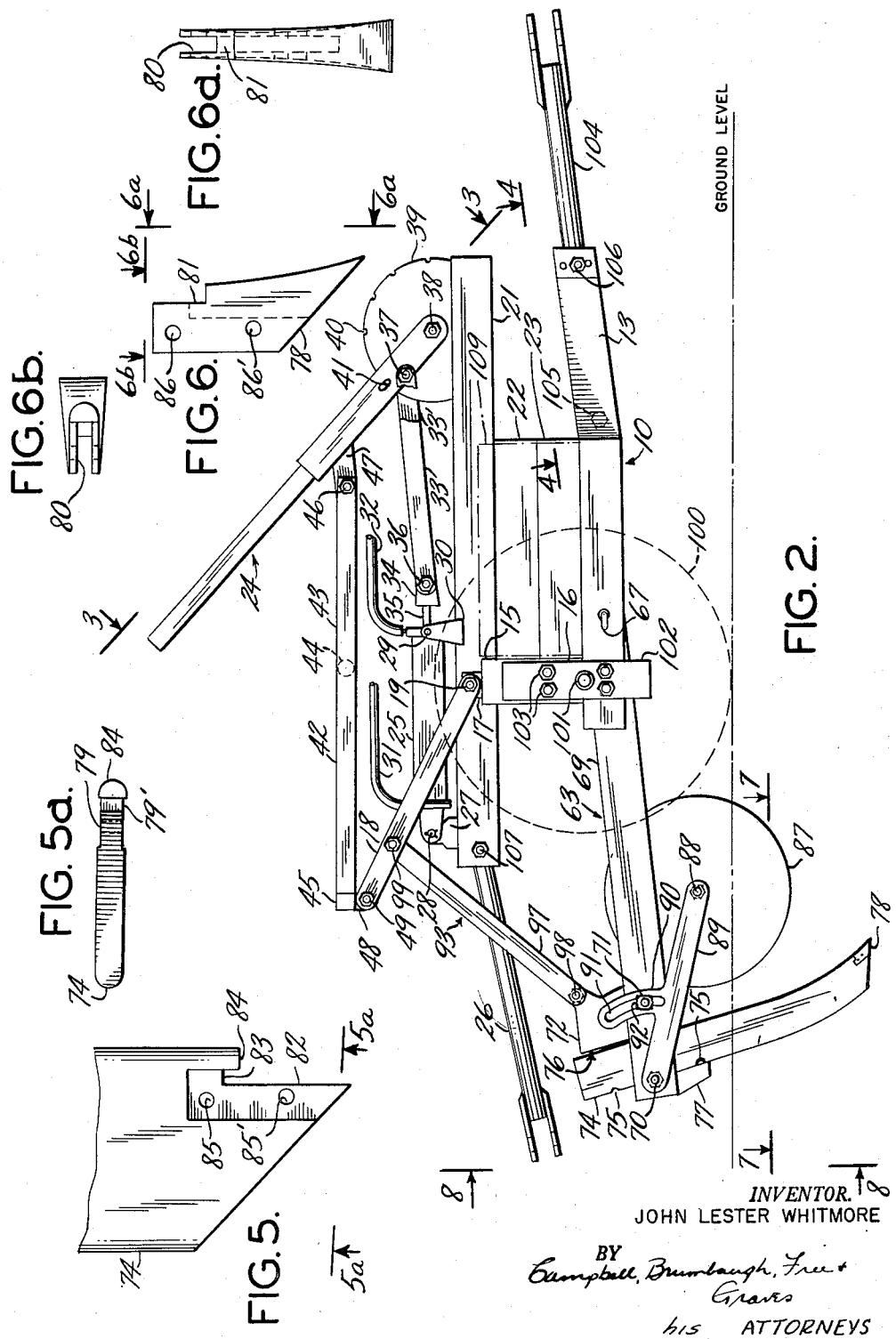
INVENTOR.
JOHN LESTER WHITMORE
BY
Campbell, Brumbaugh, Free &
Graves
his ATTORNEYS March 8, 1955  J. L. WHITMORE  2,703,518
SUBSOIL TOOL
Filed Oct. 27, 1953  3 Sheets-Sheet 3
FIG. 7.
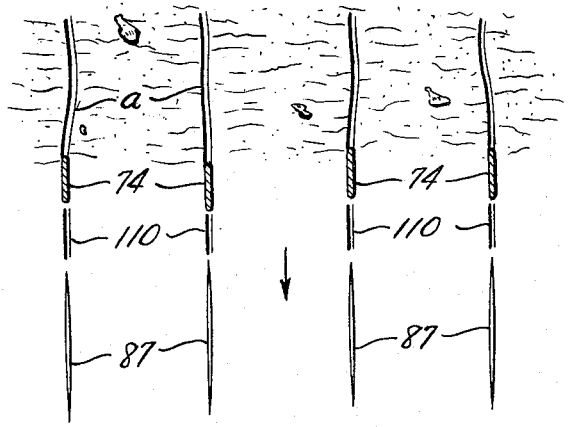
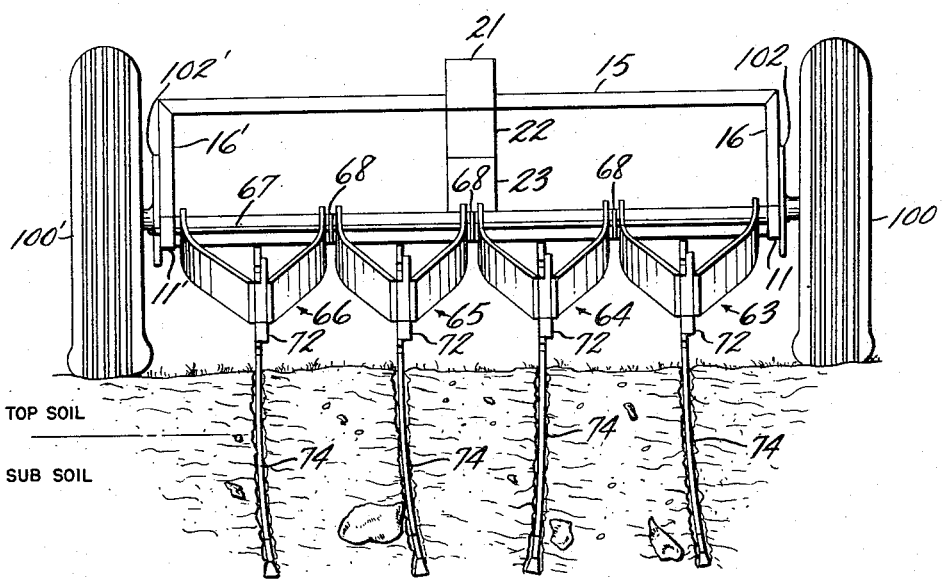
FIG. 8.
INVENTOR.
JOHN LESTER WHITMORE
BY Campbell, Brumbaugh, Free + Graves
his ATTORNEYS

United States Patent Office 2,703,518
Patented Mar. 8, 1955

2,703,518

SUBSOIL TOOL

John Lester Whitmore, Williamsport, Md.

Application October 27, 1953, Serial No. 388,486

3 Claims. (Cl. 97—78)

The present invention relates to plows and, more particularly, to a new means and method of deep plowing and soil conditioning which does not involve turning over the rich top soil.

This application is a continuation-in-part of the pending application of John Lester Whitmore, Serial No. 203,440, filed December 29, 1950.

It is well known that the soil of the earth's crust, at least the soil of farm land, is composed of two distinct layers generally referred to as top soil and sub-soil or "hard pan." The top soil is the loose thin layer made rich by decaying vegetation and the hard pan is the underlying thicker layer of relatively hard-packed material. This sub-soil should and could act as a reservoir for moisture to nourish growing things, but it is difficult and sometimes impossible for it to act in this manner due to physical structure created to a large extent by farming methods.

Every raindrop that falls on exposed loose soil blasts a tiny crater, loosening the soil into even smaller particles which are easily washed away. The drops converge into rills, then into streams, then into rivers, all flowing to the sea through channels excavated by themselves and carrying the rich top soil with them. If the rain that falls could be made to soak deep into the soil, it would not run off and carry away the valuable top soil. Deep plowing alone, using present methods, will not solve the problem since the sub-soil will simply be broken, crushed and turned to the top to become top soil and be washed away. The sub-soil must be loosened or made spongy to absorb and retain moisture which it cannot do in its hard packed state.

In addition to erosion, which is taking away billions of tons of soil each year down the streams, the water tables beneath the soil are being lost because the rain water cannot penetrate the soil. Large sums of money are being spent each year on soil conservation, but present methods of farming are doing little to aid, and much to offset soil conservation.

Presently available methods of deep plowing utilize large cumbersome implements, referred to as "sub-soilers," which have thick, heavy, spike-like fingers, some even having large spade-like tips, which penetrate into the sub-soil. As such implements are pulled forward, the heavy, non-flexible spikes tear up the soil, literally "bulldozing" their way through, and bring chunks of sub-soil, including clods of clay and rock, to the top surface, allowing a great deal of the valuable top soil to drop downwardly into the sub-soil bed. The first rainfall thereafter usually washes some of the looser, finer soil away and turns the field into substantially a mud flat of batter-like consistency in which practically nothing can be grown for about two years. Aside from the above shortcomings, such implements require tractors of considerable power to move the thick spikes through the soil.

The present invention provides a soil conditioning plowing implement which employs a plurality of resilient springy blades which penetrate both the top soil and the sub-soil, and through their bending, flexing and weaving action, as they are pulled through the soil, create small fissures and veins to conduct water to the sub-soil, without breaking or turning the top soil. The thin flexible blades are curved in a forwardly direction, causing the blades to follow a meandering, sinuous course as they pass through the soil, and this weaving action of the blades acts to loosen both the top soil and the hard sub-soil, without dropping particles of the top soil into the sub-soil bed or raising the sub-soil to the surface. By creating the fissures and veins in the soil and by loosening the hard sub-soil, the sub-soil is transformed into a sponge-like reservoir for the retention of moisture, and from which roots may draw a hitherto unavailable source of moisture and vital minerals.

By means of the present invention, the farmer can plow, sub-soil and harrow, if a harrow is attached, his land, ready to plant, in a single operation. Furthermore, the implement conditions a strip of soil which is at least or more than four times as wide as is possible with a conventional turning plow, and this is accomplished at a lower cost and with an expenditure of less energy than is required with conventional plowing methods.

These and other features of the invention will be apparent by referring to the detailed description which follows and to the accompanying drawings.

In the drawings:

Figure 1 is a top plan view of a plow embodying the present invention.

Fig. 2 is a side elevation of the invention in Figure 1, shown in operating position with the plow blades penetrating the top soil layer and the sub-soil;

Fig. 3 is a view, partially in section, taken on line 3—3 of Fig. 2, looking in the direction of the arrows, showing the details of construction of the lever used for manual positioning of the plowing blades.

Fig. 4 is a view taken on line 4—4 of Fig. 2, looking in the direction of the arrows, showing the tow bar attachment details;

Fig. 5 is a side view of the lower end of one of the plow blades, showing provision for attachment of a replaceable tip.

Fig. 5a is a view taken along the line 5a—5a of Fig. 5, looking in the direction of the arrows;

Fig. 6 is a side view of the replaceable tip which may be readily attached to or detached from the plow blade shown in Fig. 5;

Fig. 6a is a view taken along the line 6a—6a of Fig. 6, looking in the direction of the arrows;

Fig. 6b is a view taken along the line 6b—6b of Fig. 6, looking in the direction of the arrows;

Fig. 7 is a view taken on line 7—7 of Fig. 2, looking in the direction of the arrows, showing the weaving or meandering course of the flexible plow blades and the resulting effect thereof on the soil.

Fig. 8 is a view in rear elevation taken on line 8—8 of Fig. 2, with certain parts omitted for clarity, showing the flexing action of the plow blades and the resulting effect on the soil.

In Fig. 1 the implement assembly is supported by a main frame, generally indicated at 10, which is composed of a pair of substantially parallel side members 11 and 11', a pair of substantially parallel transverse members 12 and 12', a pair of A frame members 13, 13' and a pair of substantially parallel brace members 14, 14' joining the transverse members 12, 12'. The A frame members 13, 13' abut against opposite sides of a fore-and-aft U-shaped member 13a which is attached at its rear end to the center of the transverse member 12'. The construction of the frame 10 utilizes, in the present instance, steel channel members which are joined by welding, but it is to be understood, of course, that other materials and forms of construction may be used. For instance, the members may be in the form of castings or forgings, and the method of assembly may employ bolting or riveting.

A horizontal transverse bridge member 15 is supported above the main frame 10 by a pair of vertical uprights 16, 16' welded respectively to the two side members 11, 11' near their aft or free ends as shown best in Figures 2 and 8. This bridge member 15 serves as a support for four identical, spaced apart, hinge blocks 17 to which are pivoted four lever arms 18 by means of four bolts 19. Each of the lever arms 18 is composed of a pair of equal length parallel members 20, 20'.

A main fore-and-aft beam member 21, constructed in the present instance from two standard steel channels welded together to form a square hollow tube, is supported above the main frame 10 by two similarly formed square hollow tubes 22 and 23 (see Figs. 2 and 8), located one above the other on the longitudinal center line of the frame, and all three, the main beam 21 and the two support beams 22 and 23, are joined together as well as being attached to the main frame 10 by welding. These beam members may also be made of one or more castings and attached by bolts if so desired. The main fore-and-aft beam 21 serves primarily as a support for a plow blade positioning arm 24 and a hydraulically operated jack 25, but it also provides a convenient anchorage for an auxiliary implement tow bar 26.

The function of the hydraulic jack is to facilitate the operation of the plow blade positioning arm 24. The hydraulic jack 25 is attached at its rear end to a lug 27 on the beam 21 by a pin 28 retained by cotter pins and is attached at its forward end by a pair of bolts 29 to a pair of lugs 30 welded to the beam 21. The hydraulic jack 25 is the standard type well known in the art which has the usual piston and cylinder combination wherein hydraulic fluid under pressure is admitted to the chamber within the cylinder at one end to force the piston to slide to the opposite end. By providing a combination inlet and outlet port at each end of the cylinder and selectively admitting hydraulic fluid to either end, the piston can in turn be selectively forced to either end of the cylinder to form a double acting jack, such as that used in the present instance. A pair of hydraulic lines 31 and 32, shown best in Fig. 2, may be connected to the two-way valve of a hydraulic system, the fluid being circulated through the hydraulic system by a circulatory pump (not shown). The two-way valve and the circulatory pump may be conveniently mounted on either the plow or the towing tractor. The hydraulic jack is joined to the plow blade positioning arm 24 by means of a pair of parallel links 33, 33' (see Fig. 2) which are pivoted to the end fitting 34 on piston rod 35 by bolt 36 at one of their ends and pivot at their other ends on stud bolts 37 on arm 24. The arm assembly 24 is, in turn, pivoted on bolt 38 through the center point of an adjusting sector 39 welded to the beam 21 near its forward end. The sector 39 is provided with a plurality of notches 40 which cooperate with a spring pressed detent 41 in the arm assembly 24 to lock the arm in any one of several selective positions. An A frame, generally indicated at 42, composed of two round tubular legs 43, 43' and round tubular cross brace 44 is welded at its open end to a square tubular transverse bar 45 and pivoted at its opposite or closed end to the positioning arm assembly 24 on bolt 46 passing through a lug 47 which is welded to the arm assembly 24. Four bearing blocks 48, similar to the four bearing blocks 17 on transverse member 15 previously described, are welded to the underside of bar 45 to connect with the four lever arms 18 by means of pivot bolts 49.

As shown best in Fig. 3, the arm assembly 24 is composed of a lever arm 50, a shorter arm 51 and an extension arm 52. The arm 50 and arm 51 are joined together by a connecting bar 53 welded to each of the two arms to form two parallel spaced-apart arms which straddle the sector 39 to pivot on the bolt 38. The extension arm 52 is fastened at one end to the free end of arm 50 by a pair of bolts 54, 54', and has at its upper or free end a lug 55 welded thereto on which is pivoted a hand lever 56 by means of a bolt or machine screw 57. The detent bar 41 slides in two aligned elongated slots 58, 58' in arms 50 and 51 respectively and is urged downward into contact with the edge of sector 39 by a coil spring 59 seated at one end against the detent bar 41 and at its opposite end against the connecting bar 53. A rod member 60, threaded at one end and flattened and drilled at the opposite end, is attached at its threaded end to the detent bar 41 and locked in place by lock nut 61. The connecting bar 53 has an opening through its center in which the rod 60 is free to slide. A rod or wire 62 joins the flattened end of rod 60 with the lower end of hand lever 56 for raising the detent 41 by pressing the hand lever 56 toward the extension arm 52.

Referring now to Fig. 1, there are provided four substantially V-shaped draw bar assemblies, generally indicated at 63, 64, 65 and 66, which are attached to the main frame 10 by a transverse elongated pin or rod 67 which passes through bearing holes in the two side members 11, 11' and through holes in three equally spaced lug plates 68 welded to transverse frame member 12. The four draw bar or V-bar assemblies are each composed of two flat elongated arms 69, 69' spaced apart at one end and joined together at the other end by two bolts 70 and 71 passing through a one-piece blade support fitting 72 sandwiched between the two arms 69, 69'. The fitting 72, which may be in the form of a casting, is slotted on one side as at 73 (see Fig. 1) to receive an elongated flexible substantially thin blade element 74. The depth of the slot 73 is slightly less than the thickness of the blade element 74 in order that tightening of the two bolts 70 and 71 will exert a clamping action between the two draw bar arms 69, 69' to securely lock the blade 74 in place.

These thin, flexible blades 74, which constitute the primary feature of the invention, are provided with a plurality of semi-circular notches 75 along the trailing edge toward the upper end to engage the bolt 70 and thereby serve to adjust the blade length, as well as to assist in retention of the blade in its locked and operating position. Rotation of the blade 74 about the bolt 70 as a pivot under drag loads is prevented by bearing against the upper forward portion 76 and the lower aft extension finger 77 of the fitting 72. The blade element 74 which is constructed of spring steel, is approximately seven-sixteenths ($7/16$) of an inch in thickness by about three and one-half ($3\frac{1}{2}$) inches wide and has an overall length of approximately twenty-eight (28) inches. These measurements may, of course, be varied somewhat according to one's preference, but I have found from extensive test that blades having the above measurements provide the necessary flexibility and depth of cut which form the essence of the present invention. The blade is straight for slightly more than half its length and then curves forward at its lower end, as shown in Figure 2, terminating in a point which has a replaceable tip 78. The leading edge and trailing edge of the blade 74 are each rounded with a semi-circular radius throughout the length of the blade to facilitate movement through the soil.

Provision of the forward curvature of the blade at its lower end described above, is of paramount importance in practicing the invention since such curvature causes the blade to perform the required weaving motion. Repeated experiments have shown that straight blades not having this forward sweep will not weave properly, but simply slice through the soil in a straight line.

As shown in Figs. 5 and 5a, the lower extremity of the blade 74 is recessed on each side as at 79, 79' to engage with a mating slot 80 in the aft edge of tip 78. The tip 78 is also notched as at 81 to receive the back flat surface of the semi-circular finger-like projection 84 remaining after the blade 74 has been cut on lines indicated at 82 and 83 (see Fig. 5). The slotted tip 78 fits snugly over the mating notched portion of the blade 74 and due to the geometry of the engaging surfaces assists in retention of the tip. The tip is primarily retained, however, by suitable bolts passing through holes 85 and 85' in blade 74 and matching holes 86, 86' in the tip 78. The tip 78 may be constructed of hardened steel to provide a cutting edge of durable qualities. Should damage occur, the tip 78 may be readily replaced without replacing the entire blade element 74.

In order to cut thick turf and provide an initial trench or trough ahead of the blade elements 74, four rolling colters 87 are provided, one just in front of each of the four blades 74, as shown in Fig. 2. These colters are each provided with suitable bearings to receive bolts 88 for attachment to a pair of identical adjustable lever arms 89, 89' which pivot on bolt 70. The lever arms 89, 89' are each provided respectively with a pair of upwardly projecting arcuate extension arms 90 which are pierced by arcuate, tapered wall slots 91 engaged by tapered washers 92 on bolt 71. The colters may be adjusted up or down within the limits of these slots and securely locked in the desired position by tightening the bolt and nut assembly 71. Four link assemblies 93, 94, 95, and 96, each comprising a pair of parallel bars 97, 97', are pivoted by bolts 98 to the fittings 72 at one end by bolts 99 to the lever arms 18 at the opposite end. The handle 24 is connected to the upper free ends of the lever arms 18 through the above-described linkage 42, so that movement of the positioning handle 24 forward or backward will raise or lower the entire colter, blade and draw bar assembly, pivoting about pin 67.

The entire assembly is supported on a pair of wheels 100, 100' whose axles 101, 101' are welded respectively to plates 102, 102' which are attached to the uprights 16, 16' by bolts 103. Adjustment of wheel position, up or down, may be accomplished, if desired, by providing additional bolt holes suitably spaced in the plates 102, 102'. A tow bar 104 is accommodated in the U-shaped member 13a and is attached thereto by bolts 105, 106 in order that the present invention may be attached to a standard towing tractor (not shown). The rear tow bar 26, pivoted to the main beam 21 by bolt 107, may be used for pulling miscellaneous attachments, such as, for example, a disc harrow which may serve to prepare a seed bed. In order to provide additional rigidity to the frame 10 and to prevent accumulation of weeds and other debris within the mechanism of the machine it is preferable that the underside of the frame be covered by a sheet or plate (not shown), and although not essential to the invention, it may be found convenient to provide a pair of tool boxes mounted on the frame 10.

By referring to the Figures 7 and 8, the operation of the present invention may be readily understood. In Fig. 7, the colters 87 are shown cutting grooves or trenches 110 in the soil just ahead of the blades 74, which follow therein in the direction of the arrow, as well as cutting any thick turf that may exist to prevent the grass, roots, weeds, etc. from being dragged by the blades and accumulaing thereagainst. As the blades follow the colters through the soil, they twist, weave or meander in sinuous paths a to break the soil with a multitude of fissures which radiate outwardly from the blades as indicated by the irregular lines in the drawing. This meandering of the blades is caused by passing through soil of varying hardness or resistance and by stones and rocks encountered by the blades.

The action of the blades is amplified to some extent by Fig. 8 wherein the flexing of the blades is quite apparent. As these blades pass through the top soil layer and the hard pan, they bend and weave from side to side, which action moves the soil and breaks both top soil and sub-soil with many vein-like fractures or fissures radiating outwardly from the blades as they pass through the hard soil. The penetration of the blades into the ground will vary with the soil, but the penetration may be in the order of 18 to 22 inches. It is obvious that the slits cut by the blades allow moisture to penetrate to the deep sub-soil and the multitude of vein-like fissures and cracks converts the normally hard packed sub-soil into a reservoir for moisture without displacing the sub-soil to the top or letting the top soil drop to the sub-soil.

While the invention has been described with specific reference to the accompanying drawings, it is not to be limited save as defined in the appended claims.

I claim:

1. A subsoil tool supported for forward movement through the soil for conditioning the soil, comprising a thin elongated blade of resilient spring-steel stock disposed in a generally vertical plane, said blade having a substantially straight upper portion and a curved lower portion, said blade having a thickness transverse to the direction of movement of approximately seven-sixteenths of an inch and a width in the direction of movement several times as great as said thickness, said blade having sides converging at their forward portions to define a forward edge symmetrical with respect to a plane midway between said sides, said blade being of a length when it is in operative position sufficient to penetrate into the earth to a depth between eighteen and twenty-two inches, the upper portion of the blade being inclined rearwardly and the lower portion curving forwardly ahead of the upper portion when in said operative position, the thickness and width and length of the blade and the characteristics of the stock from which it is formed rendering the blade sufficiently flexible and resilient to enable it to twist and deflect as it is moved through the soil so that the blade produces a meandering slit in the soil.

2. A subsoil tool supported for forward movement through the soil for conditioning the soil, comprising a thin elongated blade of resilient spring-steel stock disposed in a generally vertical plane, said blade having a substantially straight upper portion and a curved lower portion, said blade having a thickness transverse to the direction of movement and a width in the direction of movement of about three and one-half inches, the width of the blade being several times greater than said thickness, said blade having sides converging at their forward portions to define a forward edge symmetrical with respect to a plane midway between said sides, said blade being of sufficient length that when it is in operative position it penetrates into the earth to a depth between about eighteen and twenty-two inches, the upper portion of the blade being inclined rearwardly and the lower portion curving forwardly ahead of the upper portion when the blade is in said operative position, the thickness, width and length of the blade and the characteristics of the stock from which it is formed rendering the blade sufficiently flexible and resilient to enable it to twist and deflect as it is moved through the soil so that the blade produces a meandering slit in the soil.

3. A subsoil tool supported for forward movement through the soil for conditioning the soil, comprising a thin elongated blade of resilient spring-steel stock disposed in a generally vertical plane, said blade having a length of about twenty-eight inches with a substantially straight upper portion and a curved lower portion, said blade having a thickness transverse to the direction of movement of approximately seven-sixteenths of an inch and a dimension in the direction of movement of about three and one-half inches defining sides of the blade, said sides of the blade converging at their forward portions to define a forward edge symmetrical with respect to a plane midway between said sides, said blade in operative position penetrating to a depth between eighteen and twenty-two inches with the upper portion of the blade inclined rearwardly and the lower portion curving forwardly ahead of the upper portion, the dimensions of the blade and the characteristics of the stock from which it is formed rendering the blade sufficiently flexible and resilient to enable it to twist and deflect as it is moved through the soil so that the blade produces a meandering slit in the soil.

References Cited in the file of this patent

UNITED STATES PATENTS

| | | |
|---|---|---|
| 33,877 | Chateau | Dec. 10, 1861 |
| 126,077 | Nabers | Apr. 23, 1872 |
| 273,697 | Fillebrown | Mar. 6, 1883 |
| 309,900 | Warren | Dec. 30, 1884 |
| 329,819 | Crooks | Nov. 3, 1885 |
| 337,525 | Scott | Mar. 9, 1886 |
| 339,130 | Ball | Apr. 6, 1886 |
| 375,892 | Patten | June 3, 1888 |
| 400,351 | Michael | Mar. 26, 1889 |
| 836,007 | Bippart | Nov. 13, 1906 |
| 1,106,186 | Bonkemeyer | Aug. 4, 1914 |
| 1,130,655 | Andrew et al. | Mar. 2, 1915 |
| 1,136,172 | Scott | Apr. 20, 1915 |
| 1,159,532 | Pidgeon et al. | Nov. 9, 1915 |
| 1,290,446 | White | Jan. 7, 1919 |
| 1,459,393 | Gardiner | June 19, 1923 |
| 1,514,656 | Comer | Nov. 11, 1924 |
| 2,153,038 | Corbett | Apr. 4, 1939 |
| 2,227,670 | Peterson | Jan. 7, 1941 |
| 2,236,630 | Ronning | Apr. 1, 1941 |
| 2,269,724 | Linkogel | Jan. 13, 1942 |
| 2,323,460 | Domrese et al. | July 6, 1943 |
| 2,341,802 | Morkoski | Feb. 15, 1944 |
| 2,684,617 | Johnston | July 27, 1954 |

FOREIGN PATENTS

| | | |
|---|---|---|
| 174,629 | Great Britain | Apr. 26, 1923 |
| 518,109 | France | Dec. 24, 1920 |